(12) United States Patent
Feyereisen et al.

(10) Patent No.: US 11,875,034 B2
(45) Date of Patent: Jan. 16, 2024

(54) SYSTEMS AND METHODS FOR FLIGHT DECK CUSTOMIZATION AND PILOT PERFORMANCE ANALYTICS

(71) Applicant: HONEYWELL INTERNATIONAL INC., Charlotte, NC (US)

(72) Inventors: Thea Feyereisen, Minneapolis, MN (US); Gang He, Morris Plains, NJ (US); Abiram Rajendran, Bangalore (IN); Ryan Milmoe, Phoenix, AZ (US)

( * ) Notice: Subject to any disclaimer, the term of this patent is extended or adjusted under 35 U.S.C. 154(b) by 0 days.

(21) Appl. No.: 17/647,261

(22) Filed: Jan. 6, 2022

(65) Prior Publication Data

US 2023/0102215 A1  Mar. 30, 2023

(30) Foreign Application Priority Data

Sep. 27, 2021  (IN) .............................. 202111043651

(51) Int. Cl.
| G06F 3/048 | (2013.01) |
| G06F 3/04886 | (2022.01) |
| G06F 21/35 | (2013.01) |
| H04W 4/029 | (2018.01) |
| G06F 1/16 | (2006.01) |

(52) U.S. Cl.
CPC .......... *G06F 3/04886* (2013.01); *G06F 1/163* (2013.01); *G06F 21/35* (2013.01); *H04W 4/029* (2018.02); *G06F 2221/2117* (2013.01)

(58) Field of Classification Search
None
See application file for complete search history.

(56) References Cited

U.S. PATENT DOCUMENTS

| 9,583,010 | B1* | 2/2017 | Kolek | G08G 5/0065 |
| 9,776,730 | B1* | 10/2017 | Leon | G01P 13/025 |
| 9,858,823 | B1* | 1/2018 | Lynn | G07C 5/085 |
| 9,995,936 | B1* | 6/2018 | Macannuco | G06F 3/011 |
| 10,254,544 | B1* | 4/2019 | Melzer | G02B 27/017 |
| 10,275,950 | B2* | 4/2019 | Girard | G07C 5/008 |
| 10,556,703 | B1* | 2/2020 | Skola | G08G 5/0065 |

(Continued)

FOREIGN PATENT DOCUMENTS

| CN | 104143223 A | 11/2014 |
| FR | 3086778 A1 | 4/2020 |
| WO | 20160123030 A1 | 8/2016 |

*Primary Examiner* — Hua Lu
(74) *Attorney, Agent, or Firm* — Lorenz & Kopf LLP

(57) ABSTRACT

Systems and methods for displaying a scorecard for rating pilot performance by registering a wearable device based on the identification of the wearable device through pilot profile data, location data, and an identification key data received from the wearable device; linking, the wearable device to the avionic system to receive flight data, and to a cloud server to receive computed performance scores for in-flight display by the wearable device; alternately, in response to a manual input action, authenticating pilot identity to enable pilot access and linking of the flight data to the cloud server for display; generating a set of flight components via a model specified for a flight phase based on data from the wearable device if available, and the flight data, the model includes flight performance score values; displaying a flight phase performance score; and displaying on the graphical user interface in a cockpit display the performance scorecard.

20 Claims, 11 Drawing Sheets

(56) References Cited

U.S. PATENT DOCUMENTS

| | | | |
|---|---|---|---|
| 10,832,592 B2* | 11/2020 | Holder | G09B 19/165 |
| 11,402,913 B1* | 8/2022 | Tchon | H04L 9/3231 |
| 2012/0078449 A1* | 3/2012 | Hamblin | G06Q 10/06 |
| | | | 701/3 |
| 2013/0162632 A1* | 6/2013 | Varga | H04N 13/383 |
| | | | 345/419 |
| 2014/0314216 A1* | 10/2014 | Penberthy | H04M 3/56 |
| | | | 379/88.02 |
| 2015/0079545 A1* | 3/2015 | Kurtz | G06F 21/32 |
| | | | 434/30 |
| 2017/0088284 A1* | 3/2017 | Holder | B64D 45/00 |
| 2017/0210483 A1* | 7/2017 | Hamblin | B64D 45/00 |
| 2018/0232514 A1* | 8/2018 | Brown | H04L 63/107 |
| 2018/0366008 A1* | 12/2018 | Dacre-Wright | G08G 5/0021 |
| 2019/0080802 A1* | 3/2019 | Ziobro | G16H 40/63 |
| 2019/0090800 A1* | 3/2019 | Bosworth | A61B 5/0015 |
| 2019/0260737 A1* | 8/2019 | Brown | H04W 12/08 |
| 2019/0266899 A1* | 8/2019 | Ringer | G06F 21/00 |
| 2019/0281053 A1* | 9/2019 | Brown | H04W 12/06 |
| 2020/0027378 A1* | 1/2020 | Castet | B64D 43/00 |
| 2020/0028687 A1* | 1/2020 | Castet | H04B 7/18506 |
| 2020/0050217 A1* | 2/2020 | Rose | H04N 7/181 |
| 2020/0180790 A1* | 6/2020 | Ramaswamy | G07C 5/085 |
| 2020/0298994 A1* | 9/2020 | Conaway | G06F 16/9035 |
| 2020/0342086 A1* | 10/2020 | Oung | G06F 1/163 |
| 2021/0271792 A1* | 9/2021 | McLean | G09B 9/08 |
| 2021/0304315 A1* | 9/2021 | Whitecotton | B64F 5/60 |
| 2021/0358251 A1* | 11/2021 | MacLean | G06V 40/103 |
| 2021/0407306 A1* | 12/2021 | Nielsen | G01S 13/935 |
| 2022/0230522 A1* | 7/2022 | Myers | G06V 10/141 |
| 2022/0392354 A1* | 12/2022 | Rao | G06V 40/18 |

\* cited by examiner

| Different Score Components | PREVIOUS Weights for Total Score | NEW Weights for Total Score | Weights for Approach Score | Weights for Landing Score |
|---|---|---|---|---|
| Lateral Deviation | 15 | 15 | 20 | - |
| Vertical Deviation | 15 | 15 | 20 | - |
| Approach Airspeed | 5 | 5 | 10 | - |
| Bank Angle | 5 | 5 | 10 | - |
| Path Convergence | 30 | 30 | 40 | - |
| Vertical Speed | 10 | 5 | - | 30 |
| Touchdown Point | 15 | 10 | - | 30 |
| Body Lateral Acceleration | - | 5 | - | 15 |
| Threshold Cross Height | 5 | 5 | - | 15 |
| Touchdown Airspeed | - | 5 | - | 10 |

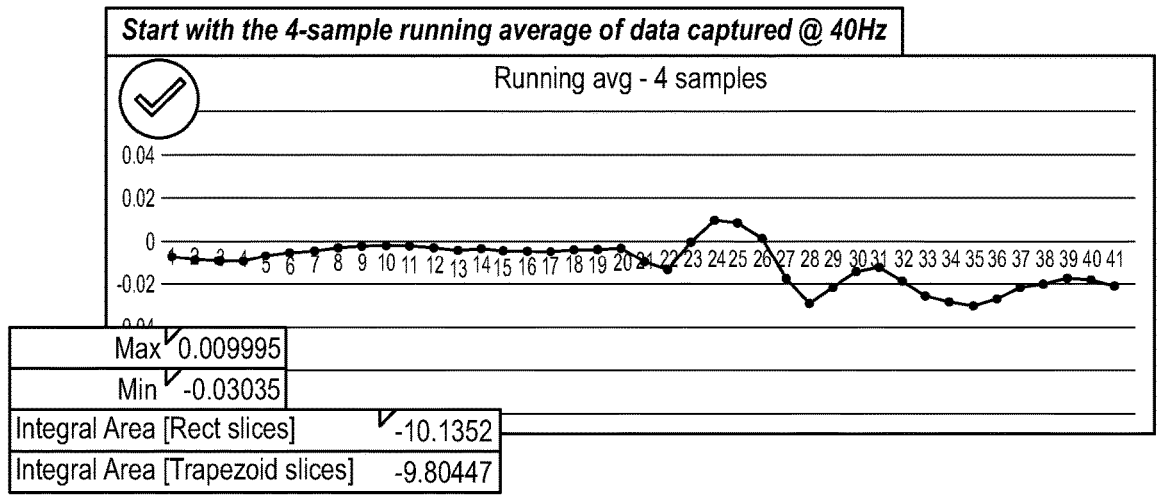
FIG. 5C
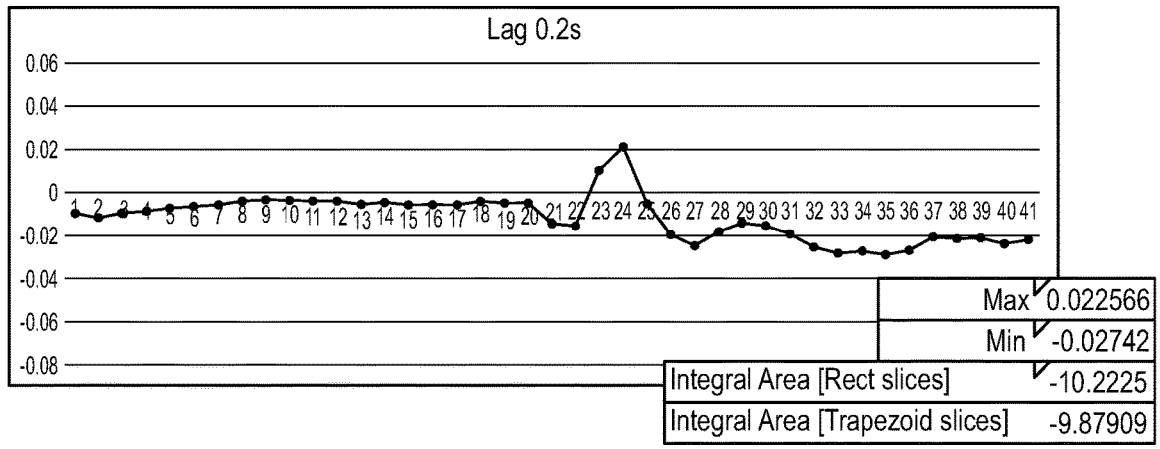
FIG. 5D
| Max Absolute Value of BodyLateralAcceleration | Score |
|---|---|
| BLA <= 0.4 | 90 |
| 0.4 < BLA <= 0.6 | 80 |
| 0.6 < BLA <= 0.8 | 70 |
| BLA > 0.8 | 60 |
FIG. 5E

SYSTEMS AND METHODS FOR FLIGHT DECK CUSTOMIZATION AND PILOT PERFORMANCE ANALYTICS

CROSS REFERENCE TO RELATED APPLICATION

This application claims priority to India Provisional Patent Application No. 202111043651, filed Sep. 27, 2021, the entire content of which is incorporated by reference herein.

TECHNICAL FIELD

The following disclosure generally relates to display systems for mobile vehicles. More particularly, the following disclosure relates to systems and methods for registering a personal device to link to aircraft systems, evaluating a pilot's performance by the aircraft systems, and displaying score results on flight segments on the personal device for the pilot to monitor in-flight.

BACKGROUND

The use of a wearable device with a display to track the health metrics of a user while performing fitness activities has become commonplace. The wearable device can provide a convenient way for the user to monitor personal vitals in real-time and to adjust the user's activities based on metrics displayed to the user for better performance. In other words, the wearable devices tracking capabilities of health metrics of the user, provide greater awareness to the user of tasks performed in conjunction with an insight of health effects on the user while performing individual tasks.

However, the function of the wearable device has generally been limited to tracking user vitals for fitness activities. It is desirable to extend functionalities of wearable devices for pilot activities during flight to enable the pilot to track pilot performance with score metrics displayed on the wearable device in flight to increase a pilot's awareness of inflight performance by personal user tracking of components of flight phase performance with assigned score metrics that are rendered score on a glanceable display on the wearable device.

Furthermore, other desirable features and characteristics of the disclosure will become apparent from the subsequent detailed description and the appended claims, taken in conjunction with the accompanying drawings, summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method for a personal scorecard for rating pilot flight performance, including: registering, by an avionic system of an aircraft, a wearable device worn by a pilot when the pilot is located in a vicinity of an aircraft cockpit by automated detection actions of the avionic system that is configured to monitor for the wearable device; in response to the detection of the pilot's wearable device, authenticating, by the avionic system, the wearable device based on identification of the wearable device through pilot profile data, location data, and an identification key data received from the wearable device; in response to authentication of the wearable device, linking, by the avionic system the wearable device to the avionic system to receive flight data, and to a cloud server to receive computed performance scores for in-flight display by the wearable device; alternately, in response to a manual input action by the pilot via an interface of the avionic system in the aircraft cockpit, authenticating, by the avionic system, pilot identity for enabling pilot access and linking of the flight data to the cloud server for receiving the computed performance scores, without use of the wearable device, for display in-flight via a cockpit display; generating, by the avionic system, a set of flight components via a model specified for a flight phase based on data from the wearable device if available, and the flight data wherein the model comprises flight performance score values computed by a scorecard performance engine for the flight phase and is stored locally or received from the cloud server wherein the scorecard performance engine is hosted by the cloud server in communication with the avionic system; displaying, by the avionic system, in a graphical user interface that depicts the model in accordance with the flight phase, a total flight phase performance score computed by the scorecard performance engine wherein the total flight phase performance score is computed from a sum of a set of one or more component scores of a plurality of components of the flight phase; and displaying, by the avionic system, on the graphical user interface in the cockpit display the scorecard comprising at least an icon with a geo-referenced position and the total flight phase performance score.

In at least one exemplary embodiment, the method further includes displaying at least information of the flight phase and the total flight phase performance score on the wearable device simultaneous with the cockpit display of the scorecard thereby enhancing pilot personal performance awareness in real-time by viewing the total flight phase score on the display of the wearable device when performing current flight activities.

In at least one exemplary embodiment, each component performance score of the total flight phase performance score is derived by comparison by the scorecard performance engine of flight data and a prior component performance score wherein the total flight phase performance score is computed based on a weighting of each of the one or more component scores of the plurality of components of the flight phase by the scorecard performance engine.

In at least one exemplary embodiment, the method further includes rendering, on the display of the wearable device, a flight performance scorecard including glanceable information of at least a flight phase component score for pilot consumption by a moment view of the display of the wearable device.

In at least one exemplary embodiment, the method further includes rendering on the display of the wearable device, context-relevant information of a flight phase event, and flight phase component that is glanceable for pilot consumption by a moment view of the display of the wearable device.

In at least one exemplary embodiment, the method further includes rendering on the display of the wearable device, a touch actuation screen of the graphical user interface for the pilot to enter a profile ID, and for the wearable device to transmit a unique ID to the cloud server via the avionic system with a profile key identification for authenticating the wearable device to the avionic system, and for linking the wearable device to the cloud server.

In at least one exemplary embodiment, the flight phase component score is a real-time computation of weighted different score components generated by a flight management scoring application and transmitted via a network cloud to the avionic system.

In at least one exemplary embodiment, the method further includes displaying, in a plurality of regions of a pilot performance scorecard, the icon of the aircraft in the flight phase with metrics of labeled flight components on the icon and location metrics of the aircraft displayed on the model, and associated flight phase performance scores.

In at least one exemplary embodiment, the method further includes displaying a vertical deviation graph with the model corresponding to the location of the aircraft and the vertical deviation in the flight phase wherein the vertical deviation graphs display changes in vertical height on an approach.

In at least one exemplary embodiment, the method further includes placing the wearable device in a set-up mode for setting up a pilot registration; creating a pilot profile in a registration mode of the wearable device using the graphic user interface of the avionic system in conjunction with the wearable device, and sending the pilot profile to send to the cloud server; in response to receipt of the pilot profile by the cloud server, generating by the cloud server a profile identification key for linking the wearable device to the avionic system; sending the profile identification key to the scorecard performance application at a networked cloud-server by the avionic system, adding the profile identification key to a database by a server scorecard performance application at the networked cloud server; and in response to confirmation of the profile identification key, configuring a pilot registration process for the avionic system to authenticate the wearable device.

In at least one exemplary embodiment, the method further includes in response to a user entering a profile identification and actuating a register button on a graphical user interface of the wearable device, transmitting by the wearable device a profile identification key to cloud server with the profile identification to link the wearable device to the cloud server for enabling display of a scorecard in each flight phase.

Provided is a system for displaying a scorecard for rating pilot flight performance. The system includes an avionic system which is configured to register a wearable device worn by a pilot when the pilot is located in a vicinity of an aircraft cockpit, by automated detection actions of the avionic system based on identification of the wearable device through pilot profile data, location data, and an identification key data received from the wearable device; in response to authentication of the wearable device, the avionic system is configured to link the wearable device with the avionic system to receive flight data, and to a cloud server to receive computed performance scores for in-flight display by the wearable device; in an alternate mode of operation, the avionic system is configured to receive a manual input action by the pilot via an interface of the avionic system in the aircraft cockpit, to authenticate a pilot identity to enable pilot access and linking of the flight data to the cloud server to receive the computed performance scores, without use of the wearable device, to display in-flight via a cockpit display; the avionic system is configured to generate a set of flight components via a model specified for a flight phase based on data from the wearable device if available, and the flight data wherein the model comprises flight performance score values computed by a scorecard performance engine for the flight phase and is stored locally or received from the cloud server wherein the scorecard performance engine is hosted by the cloud server in communication with the avionic system; the avionic system is configured to display in a graphical user interface that depicts the model in accordance with the flight phase, a total flight phase performance score computed by the scorecard performance engine wherein the total flight phase performance score is computed from a sum of a set of one or more component scores of a plurality of components of the flight phase; and the avionic system is configured to display on the graphical user interface in the cockpit display the scorecard comprising at least the icon with a geo-referenced position and the total flight phase performance score.

In at least one exemplary embodiment, the system includes the avionic system configured to display at least information of the flight phase and the total flight phase performance score on the wearable device simultaneous with the cockpit display of the scorecard thereby enhancing pilot personal performance awareness in real-time by viewing of the total flight phase score on the display of the wearable device when performing current flight activities.

In at least one exemplary embodiment, each component performance score of the total flight phase performance score is derived by comparison by the scorecard performance engine of flight data and a prior component performance score wherein the total flight phase performance score is computed based on a weighting of each of the one or more component scores of the plurality of components of the flight phase by the scorecard performance engine.

In at least one exemplary embodiment, the system includes the avionic system configured to send information of the scorecard for display by the wearable device wherein the information including glanceable information of at least a flight phase component score for pilot consumption by a moment view of the display of the wearable device.

In at least one exemplary embodiment, the system includes the avionic system configured to send information for display by the wearable device, including context-relevant information of a flight phase event, and a flight phase component that is glanceable for pilot consumption by a moment view of the display of the wearable device.

In at least one exemplary embodiment, the system includes the avionic system configured to display the wearable device, a touch actuation screen of the graphical user interface for the pilot to enter a profile ID, and for the wearable device to transmit a unique ID to the cloud server via the avionic system with a profile key identification for authenticating the wearable device to the avionic system, and for linking the wearable device to the cloud server.

In at least one exemplary embodiment, the flight phase component score is a real-time computation of weighted different score components generated by a flight management scoring application and transmitted via a network cloud to the avionic system.

In at least one exemplary embodiment, the avionic system is configured to display, in a plurality of regions of a pilot performance scorecard, the icon of the aircraft in the flight phase with metrics of labeled flight components on the icon and location metrics of the aircraft displayed on the icon, and associated flight phase performance scores.

Provided is a system including at least one processor, communicatively coupled to a system memory element. The at least one processor is configured to register a wearable device worn by a pilot when the pilot is located in a vicinity of an aircraft cockpit, by automated detection actions of the avionic system that is configured to monitor for the wearable device; in response to the detection of the pilot's wearable device, authenticate the wearable device based on identification of the wearable device through pilot profile data, location data, and an identification key data received from the wearable device; in response to authentication of the wearable device, link the wearable device to the avionic system to receive flight data, and to a cloud server to receive computed performance scores for in-flight display by the wearable device; alternately, in another mode of operation, in response to a manual input action by the pilot via an interface of the avionic system in the aircraft cockpit, authenticate pilot identity to enable pilot access and linking of the flight data to the cloud server to receive the computed performance scores, without use of the wearable device, for display in-flight via a cockpit display; generate a set of flight components via a model specified for a flight phase based on data from the wearable device if available, and the flight data wherein the model comprises total flight performance score value computed by a scorecard performance engine for the flight phase and is stored locally or received from the cloud server wherein the scorecard performance engine is hosted by the cloud server in communication with the avionic system; display in a graphical user interface that depicts the model in accordance with the flight phase, the total flight phase performance score computed by the scorecard performance engine wherein the total flight phase performance score is computed from a sum of a set of one or more component scores of a plurality of components of the flight phase; and display on the graphical user interface in the cockpit display, a scorecard comprising at least an icon with a geo-referenced position and the total flight phase performance score.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and:

Figure 5A:
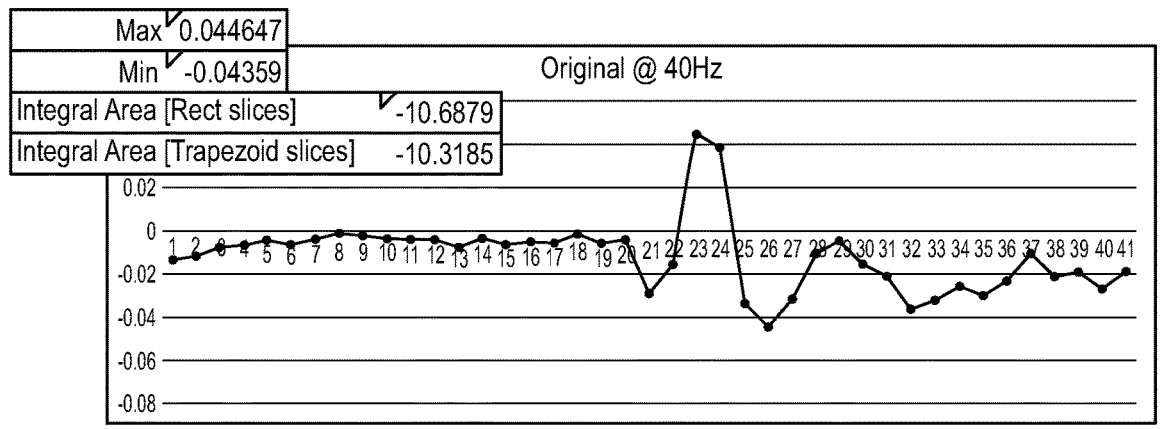
Figure 5B:
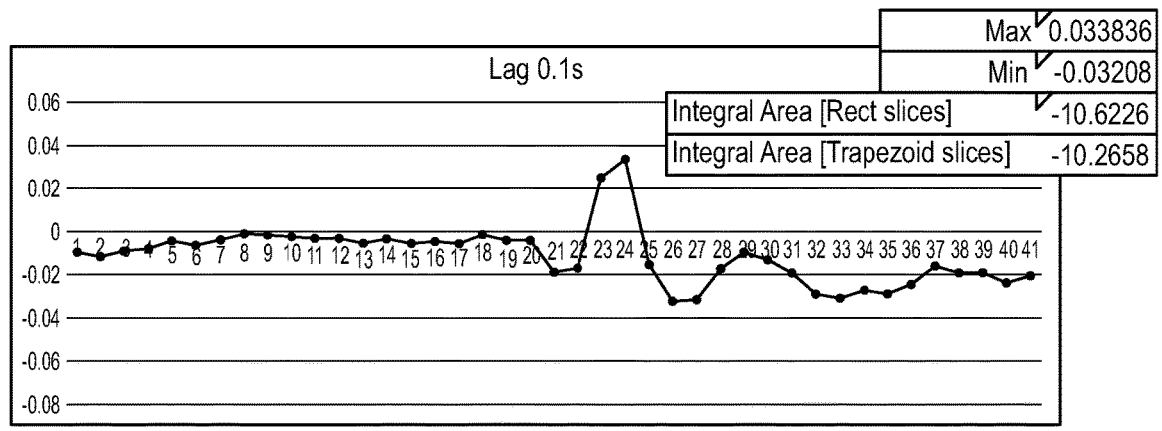
Figure 6:
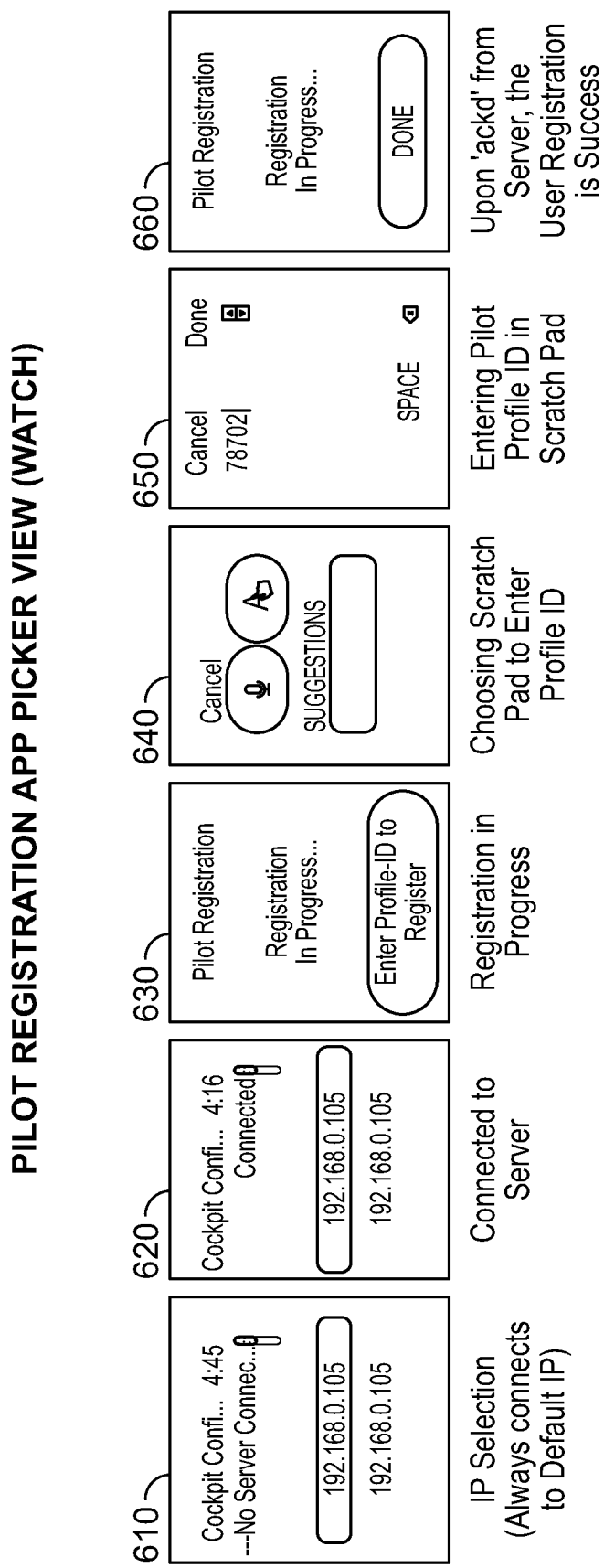
Figure 7:
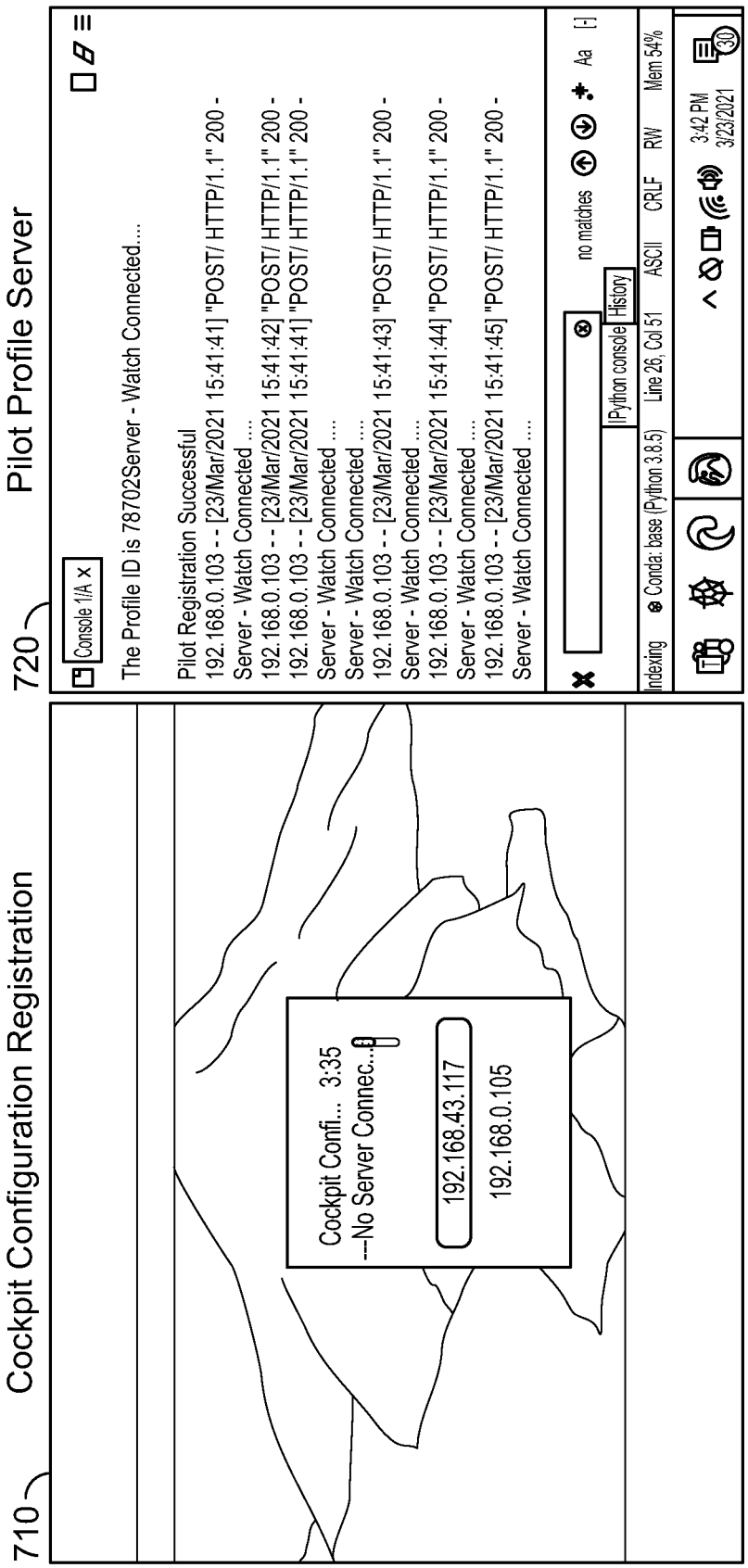
Figure 8:
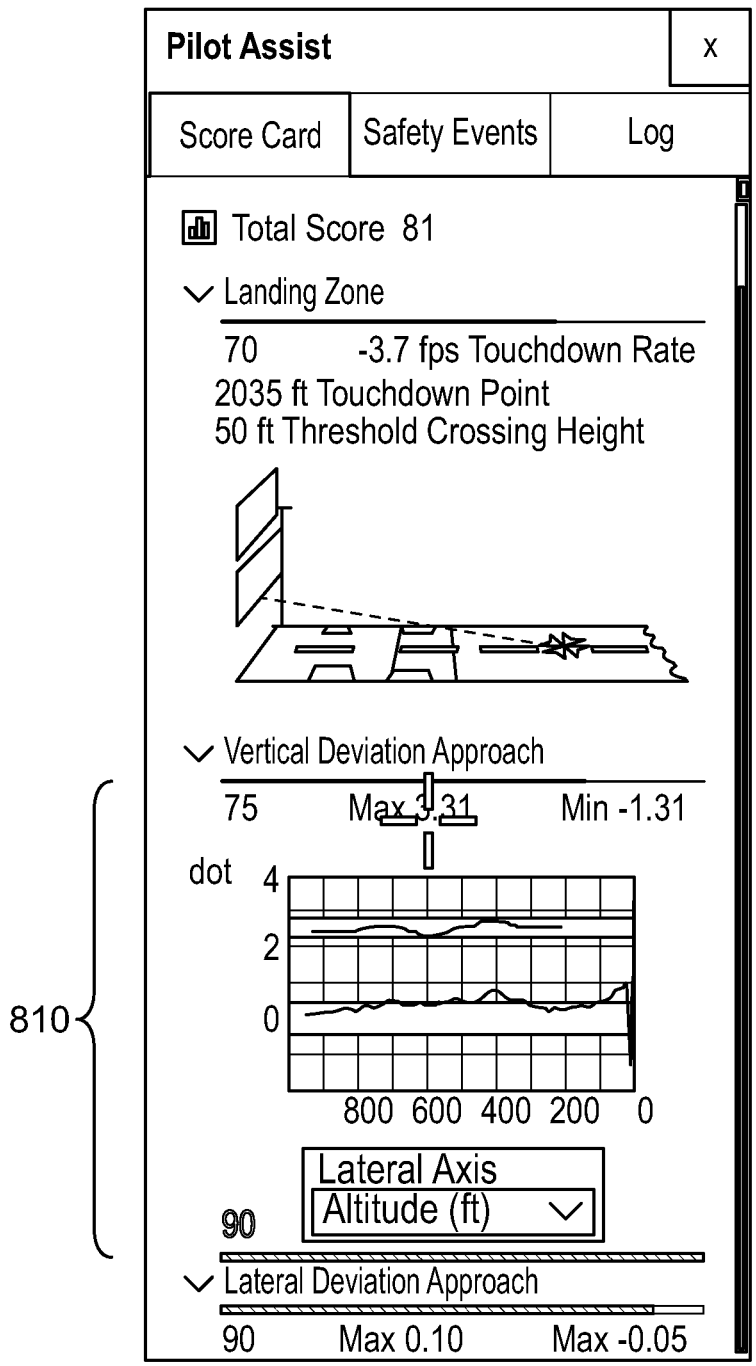
Figure 9A:
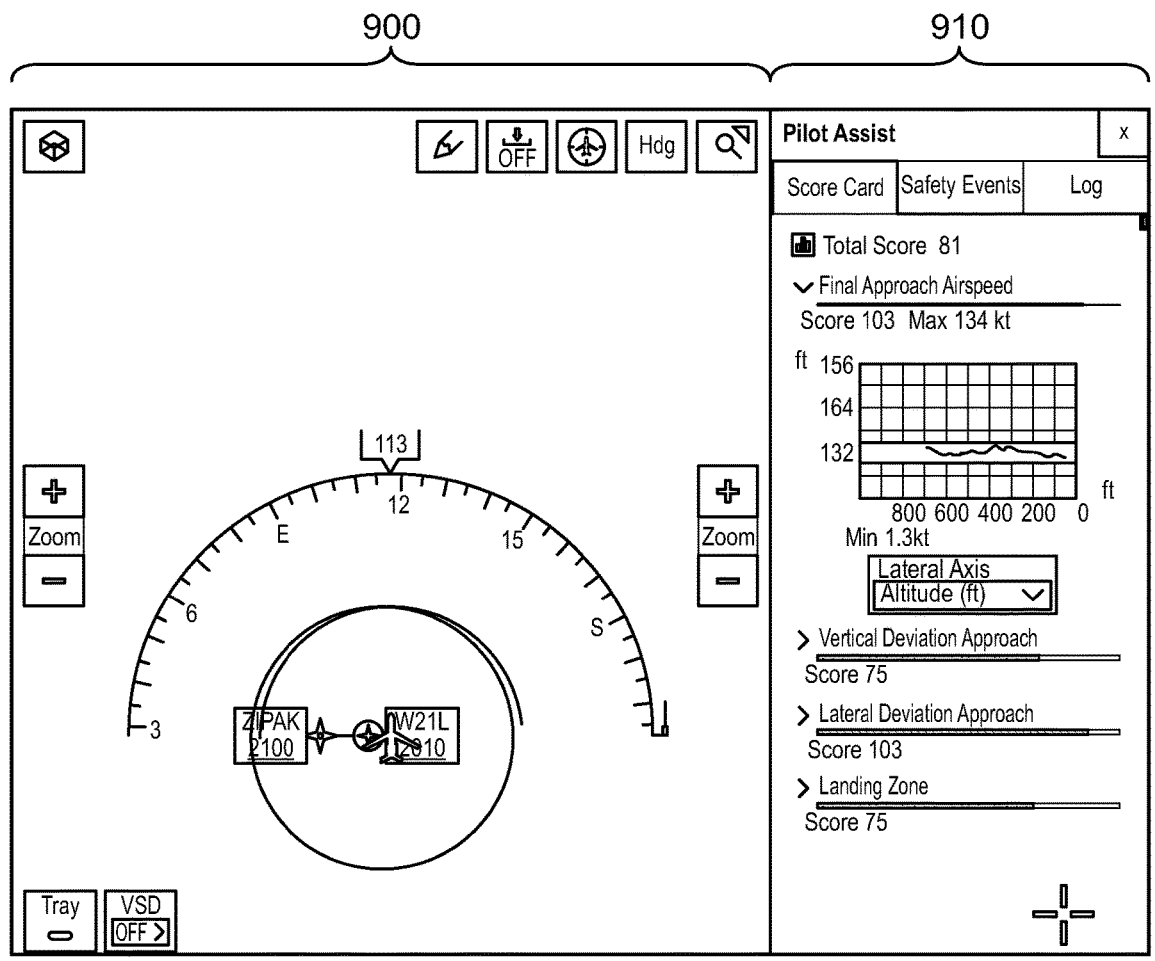
Figure 9B:
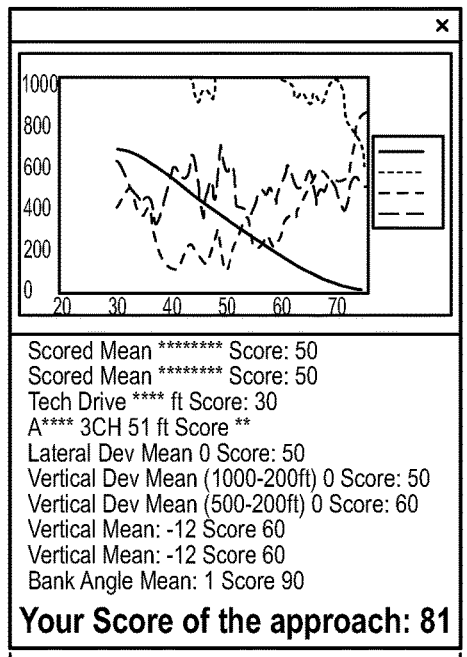
Figure 10A:
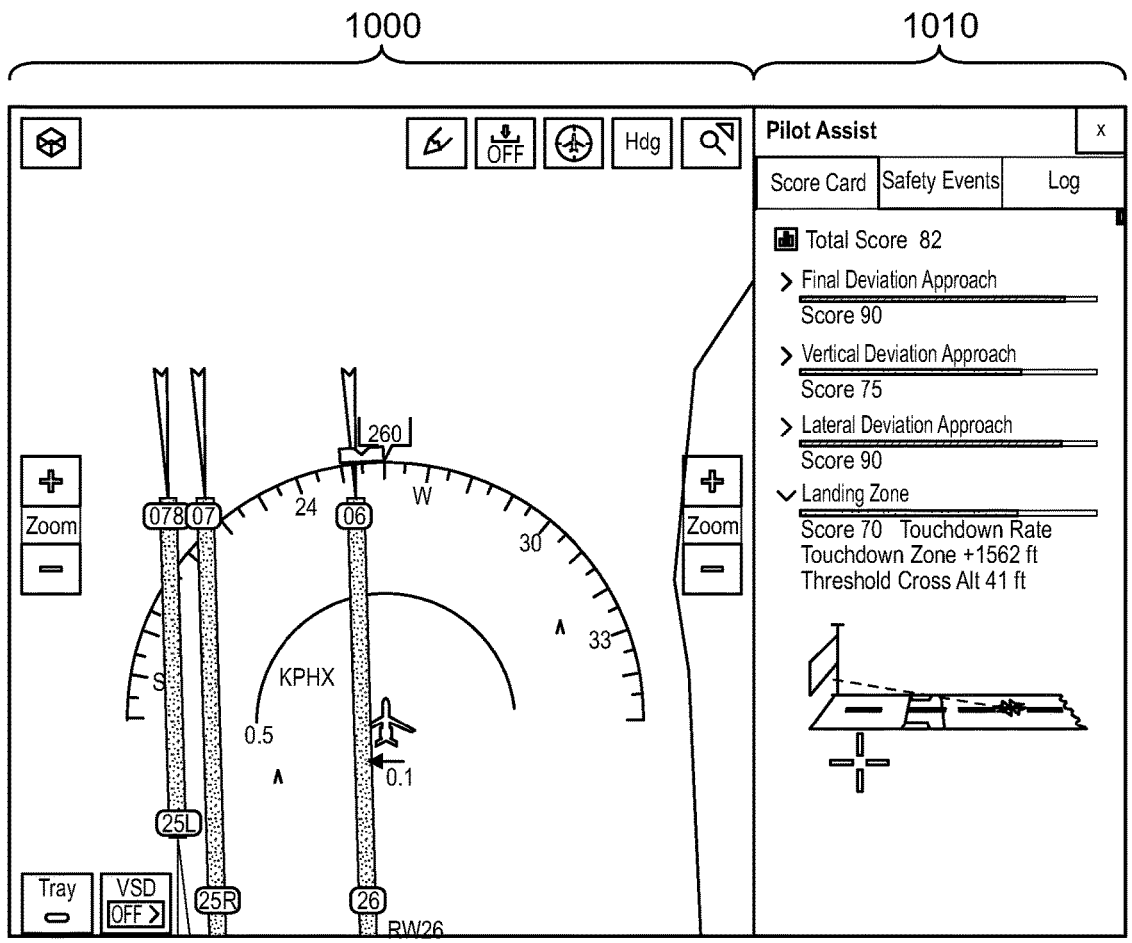
Figure 10B:
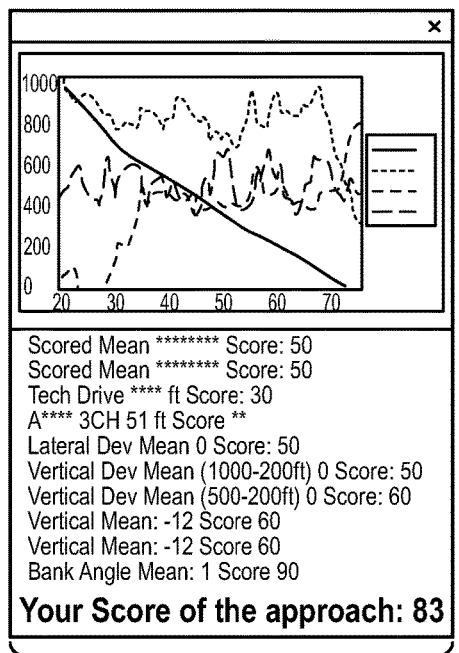
Figure 11:
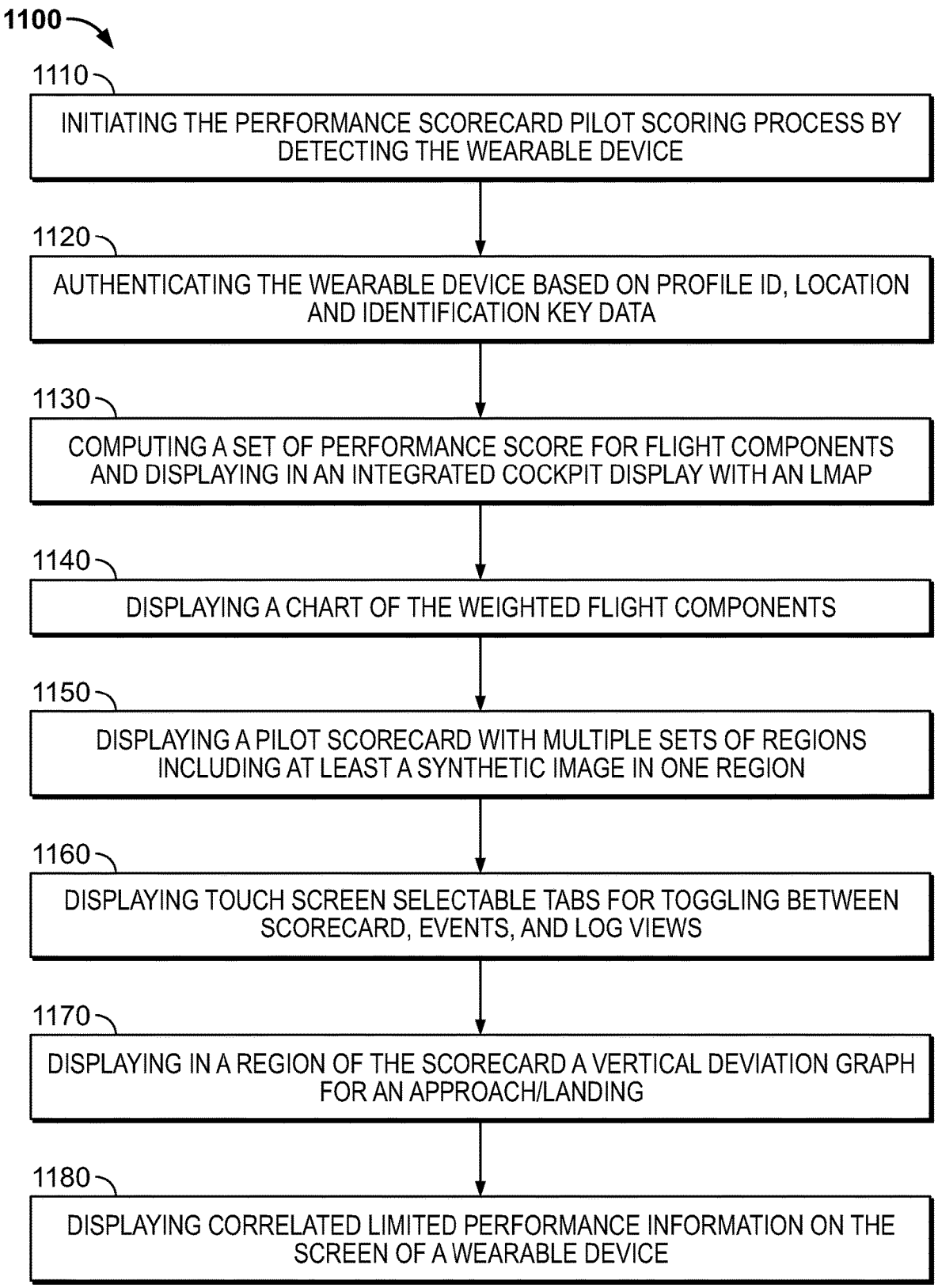

FIGS. 5A, 5B, 5C, 5D, and 5E depict a set of graphs and a threshold chart that show capturing of body lateral acceleration (BLA) data at a frequency of 40 Hz in FIGS. 5A and 5B, and the logging of data at a lag of 0.1 and 0.2 seconds in FIGS. 5C and 5D, and the thresholds allocated to the component in the threshold chart of FIG. 5E of the BLA to determine the weight to be allocated to the BLA component in the total pilot performance score computation of the set of different components of the pilot performance scorecard system in accordance with exemplary embodiments of the present disclosure;

FIG. 6 depicts a set of diagrams of an exemplary set of a sequence of onscreen displays of a pilot registration application of a wearable device of the pilot performance scorecard system in accordance with exemplary embodiments of the present disclosure;

FIG. 7 illustrates a display on a cockpit of the registration of the wearable device, and the pilot cloud server logs of IP connections to the wearable device of the pilot performance scorecard system in accordance with exemplary embodiments;

FIG. 8 depicts a diagram of a screenshot of an exemplary display of the pilot performance scorecard with the graph of the vertical deviation of aircraft on an approach and landing the pilot performance scorecard system in accordance with exemplary embodiments of the present disclosure;

FIGS. 9A and 9B depicts diagrams of a lateral navigation display with side by side scorecard display including an icon of the aircraft state, and a related weighted component chart of calculated component scores for the total pilot performance score of the pilot performance scorecard system in accordance with exemplary embodiments of the present disclosure;

FIGS. 10A and 10B depict diagrams of a lateral navigation display with side by side scorecard display including an icon of the aircraft state, and a related weighted component chart of calculated component scores for the total pilot performance score of the pilot performance scorecard system in accordance with exemplary embodiments of the present disclosure; and FIG. 11 depicts a flowchart of an exemplary process for calculating the total performance score of the pilot scorecard performance system in accordance with various exemplary embodiments of the present disclosure.

DETAILED DESCRIPTION

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application-specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

Wearable consumer (personal) devices as mentioned provide convenient metric awareness of a user's physiology and are commonly used in conjunction when the user is performing an activity. The wearable consumer devices have not been extended or used in conjunction because of technical obstacles with monitoring and providing performance feedback for sophisticated activities such as in the case of a pilot engaging in-flight operations and performing tasks in-flight associated with flight activities.

In embodiments, the present disclosure describes methods and systems that enable an ecosystem for custom tracking and storing flight activities and performance-related component scores of the pilot.

In embodiments, the present disclosure provides a personalized scorecard and ecosystem to provide ease of use in tracking, reviewing, and storing personalized flight activities and performance via a wearable device. The information can be shared and used with others socially or within a company to identify trends and performance gap areas, that will likely lead to improved pilot awareness of performance related to safety, and assist pilots to manage requirements for training and recurrency.

In embodiments, through a pilot wearable like a smartwatch or key fob, or alternatively facial recognition with an onboard installed camera, the pilot profile is identified/registered. In embodiments, the recognition step may also trigger particular pilot displays (full-screen PFD or ½ screen) or cockpit configuration (seat adjustment, cockpit temperature) settings. In addition, the registration process can enable systems to track personal pilot metrics tied to an aircraft type and tail. Other metrics that may also be tracked include aircraft block time, integration of onboard system to understand flight itinerary, en-route time, day vs night time, amount of time hand vs. automation flown during phases of flight, or route of flight. In addition to pilot performance metrics, other metrics like the deviation from desired lateral, vertical, or path trajectory of the aircraft, are collected. An approach and/or landing and/or overall performance score is provided to the pilot and tagged to the pilot profile settings. The score information is provided in the onboard avionics, and in addition, maybe displayed by offboard apps on personal devices like an iPad, smartphone, or any linked computer device with processing capabilities to enable the required communications and displaying of webpages. This data for performance, safety event triggering (e.g., EGPWS alerts, TCAS alerts), and aircraft log (Total Time, Day time, Nighttime, use of automation, most frequent accessed system pages) are captured per pilot and aircraft type and tail and are shared for offboard applications like personal metric storage and social sharing sites.

While the following exemplary embodiments are discussed in terms of an aircraft in flight, it should be appreciated that other embodiments may be employed in other contexts that currently rely on a regulated, periodically updated navigation database.

Figure 1:
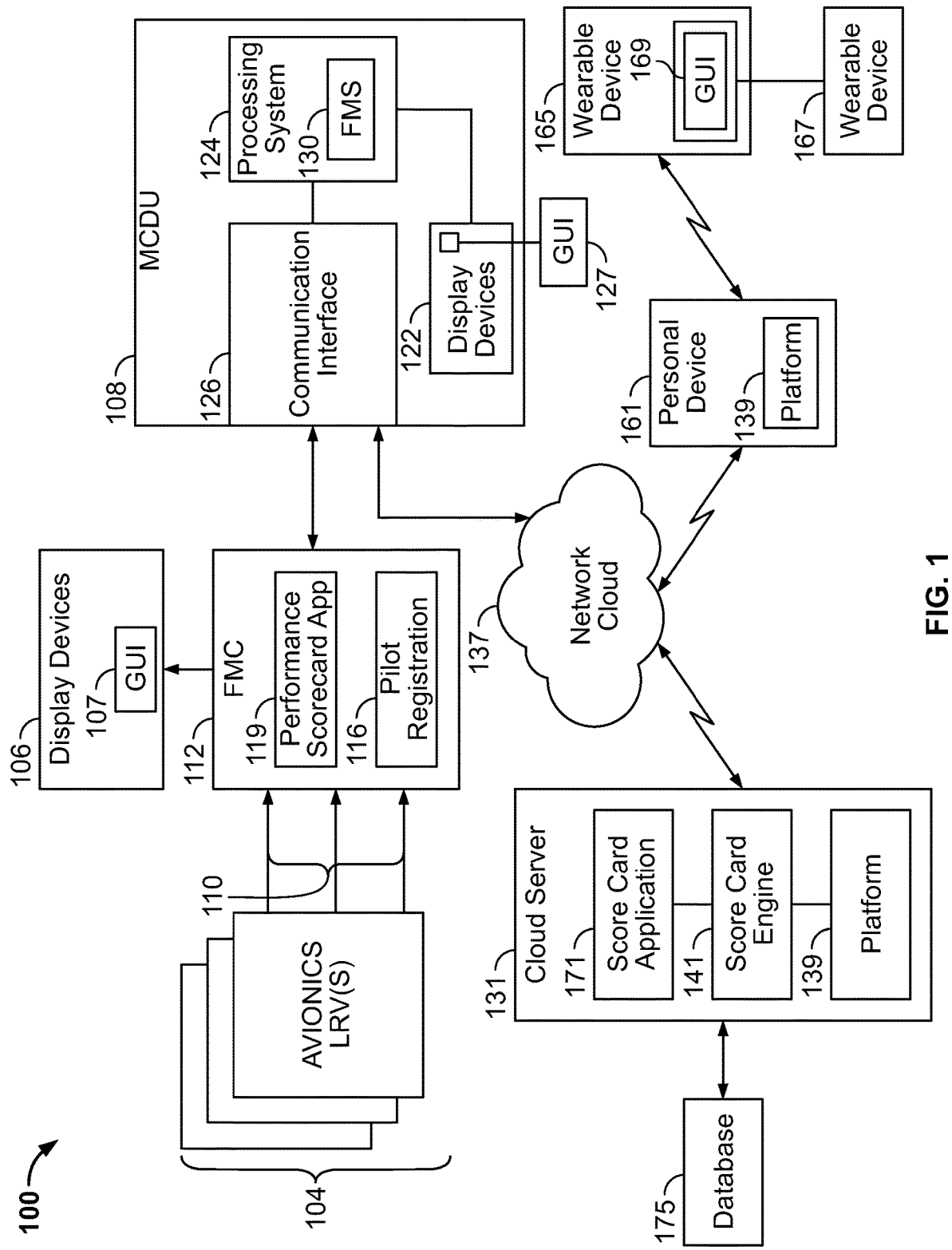
FIG. 1 depicts an avionic system for pilot registration and pilot performance score computation communicating with a wearable device of the pilot performance scorecard system, in accordance with exemplary embodiments of the present disclosure.

FIG. 1 depicts an exemplary embodiment of an aircraft system suitable for implementation onboard an aircraft with communication with a wearable device to enable the pilot scorecard performance system and to perform the registration of the wearable device, and a display of the pilot performance rating score that has been computed based on a set of weights for an approach and landing of the aircraft. FIG. 1 depicts various aspects of the aircraft system 100 that include elements for registering the wearable device with avionic systems of the aircraft using touch screen input by the pilot on an avionic display in a cockpit of an aircraft, in accordance with an exemplary and non-limiting embodiment of the present disclosure.

In embodiments, the aircraft system 100 may be utilized on board with a mobile platform to communicate data and requests to provide registration of the wearable device with the avionic system. In embodiments, the mobile platform is an aircraft avionic system, which carries or is equipped with aircraft system 100.

The aircraft may be any type of vehicle that can travel through the air (i.e., without physical contact with terrain or water). As such, aircraft may be any type of airplane (regardless of size or propulsion means, ranging from large, turbine-powered commercial airplanes to small, electrically-powered drones), rotorcraft (helicopter, gyrocopter), lighter-than-air vessel (hot-air balloon, blimp), or glider, for example. Aircraft may be "manned" in the conventional sense that the flight crew is present within the aircraft, or it may be manned remotely.

The illustrated aircraft system 100 includes a flight management computing module 102 communicatively coupled to a plurality of onboard avionics LRUs 104, one or more display devices 106, and a multifunction computing module 108. It should be appreciated that FIG. 1 depicts a simplified representation of the system 100 for purposes of explanation, and FIG. 1 is not intended to limit the subject matter in any way.

The flight management computing module 102 generally represents the FMC, the FMS, or other hardware, circuitry, logic, firmware, and/or other components installed onboard the aircraft and configured to perform various tasks, functions, and/or operations about flight management, flight planning, flight guidance, flight envelope protection, four-dimensional trajectory generation or required time of arrival (RTA) management, and the like. Accordingly, for purposes of explanation, but without limiting the functionality performed by or supported at the flight management computing module 102, the flight management computing module 102 may alternatively be referred to herein as the FMC. The FMC 102 includes a plurality of interfaces 110 configured to support communications with the avionics LRUs 104 along with one or more display interfaces 112 configured to support coupling one or more display devices 106 to the FMC 102. In the illustrated embodiment, the FMC 102 also includes a communications interface 114 that supports coupling the multifunction computing module 108 to the FMC 102.

The FMC 102 generally includes a processing system designed to perform flight management functions, and potentially other functions pertaining to flight planning, flight guidance, flight envelope protection, and the like. Depending on the embodiment, the processing system could be realized as or otherwise include one or more processors, controllers, application-specific integrated circuits, programmable logic devices, discrete gate or transistor logic, discrete hardware components, or any combination thereof. The processing system of the FMC 102 generally includes or otherwise accesses a data storage element (or memory), which may be realized as any sort of non-transitory short or long-term storage media capable of storing programming instructions for execution by the processing system of the FMC 102. In exemplary embodiments, the data storage element stores or otherwise maintains code or other computer-executable programming instructions that, when read and executed by the processing system of the FMC 102, cause the FMC 102 to implement, generate, or otherwise support a pilot registration application 116 and the pilot scorecard performance application 119 that performs certain tasks, operations, functions, and processes described herein.

The avionics LRUs 104 generally represents the electronic components or modules installed onboard the aircraft that support navigation, flight planning, and other aircraft control functions conventionally and/or provide real-time data and/or information regarding the operational status of the aircraft to the FMC 102. For example, practical embodiments of the aircraft system 100 will likely include one or more of the following avionics LRUs 104 suitably configured to support the operation of the aircraft: a weather system, an air traffic management system, a radar system, a traffic avoidance system, Terrain Avoidance and Warning System (TAWS), Runway Awareness and Advisory System (RAAS), an autopilot system, an autothrottle (or auto thrust) system, a flight control system, hydraulics systems, pneumatics systems, environmental systems, electrical systems, engine systems, trim systems, lighting systems, crew alerting systems, electronic checklist systems, and/or another suitable avionics system.

In exemplary embodiments, the LRUs 104 enable the tracking of personal pilot metrics tied to aircraft type and tail. Such metrics include aircraft block time, integration of onboard system to understand flight itinerary, en-route time, day vs nighttime, amount of time hand vs. automation flown during phases of flight, or route of flight. In addition to pilot performance metrics like the deviation from desired lateral, vertical, or path trajectory, are collected by the LRUs 104.

In an exemplary embodiment, data tracked by the LRUs 104 is sent via the network cloud 137 via a platform 139 to a scorecard performance engine 141 that is configured to determine an approach and/or landing and/or overall performance score of pilot related flight activities and the scoring information is tagged to a pilot profile settings for retrieval with pilot identification. The performance score information can also be provided in the onboard avionics for display on cockpit display devices via a graphical user interface 107, and display devices 122 via GUI 127. In addition, offboard apps are hosted by personal devices 161 such as an iPad, smartphone, or on any computer configured with browser access to the network cloud 137 with capabilities for displaying a webpage.

In exemplary embodiments, the data for performance, safety event triggering (e.g., EGPWS alerts, TCAS alerts), and aircraft log (Total Time, Day time, Nighttime, use of automation, most frequent accessed system pages) are captured per pilot and aircraft type and tail and are shared for offboard applications like personal metric storage and social sharing connected via the personal device 161 using the platform 139. Platform 139 is a multidevice platform enabling communicating of performance data on multiple platforms, and the synchronizing of the performance scores on the multiple platforms.

In exemplary embodiments, the avionics interfaces 110 are realized as different ports, terminals, channels, connectors, or the like associated with the FMC 102 that are connected to different avionics LRUs 104 via different wiring, cabling, buses, or the like. In this regard, interface 110 may be configured to support different communications protocols or different data formats corresponding to the respective type of avionics LRU 104 that is connected to a particular interface 110. For example, the FMC 102 may communicate navigation data from a navigation system via a navigation interface 110 coupled to a data bus supporting the ARINC 424 (or A424) standard, the ARINC 629 (or A629) standard, the ARINC 422 (or A422) standard, or the like. As another example, a datalink system or other communications LRU 104 may utilize an ARINC 619 (or A619) compatible avionics bus interface for communicating datalink communications or other communications data with the FMC 102.

The display device(s) 106 generally represent the electronic displays installed onboard the aircraft in the cockpit, and depending on the embodiment, could be realized as one or more monitors, screens, liquid crystal displays (LCDs), a light-emitting diode (LED) displays, or any other suitable electronic display(s) capable of graphically displaying data and/or information provided by the FMC 102 via the display interface(s) 112. Similar to the avionics interfaces 110, the display interfaces 112 are realized as different ports, terminals, channels, connectors, or the like associated with the FMC 102 that are connected to different cockpit displays 106 via corresponding wiring, cabling, buses, or the like. In one or more embodiments, the display interfaces 112 are configured to support communications in accordance with the ARINC 661 (or A661) standard. In one embodiment, the FMC 102 communicates with a lateral map display device 106 using the ARINC 702 (or A702) standard.

In exemplary embodiments, the multifunction computing module 108 is realized as a multifunction control and display unit (MCDU) that includes one or more user interfaces, such as one or more input devices 120 and/or one or more display devices 122, a processing system 124, and a communications module 126. The MCDU 108 generally includes at least one user input device 120 that is coupled to the processing system 124 and capable of receiving inputs from a user, such as, for example, a keyboard, a keypad, a mouse, a joystick, a directional pad, a touchscreen, a touch panel, a motion sensor, or any other suitable user input device or combinations thereof. The display device(s) 122 may be realized as any sort of monitor, screen, LCD, LED display, or other suitable electronic display capable of graphically displaying data and/or information under the control of the processing system 124.

In exemplary embodiments, the display device(s) 122 may be configured with an interactive display of safety information on a navigation display (CORA/Inav) configured by the GUI 127 to display a scorecard image of a pilot's flight performance with selectable tabs to change synthetic images of the aircraft labeled with metrics and events. The display shows geo-referenced event data and the event likelihood based on current flight conditions. In some embodiments, additional safety information from third parties may be displayed as well.

In embodiments, the aircraft system 100 analyses flight data and generates safety event information which is displayed to pilots in-flight in a scorecard image configured with a GUI 127 to enhance their awareness of the prevalence of these events and the pilot performance rating relative to their flight. The data is geo-referenced on a lateral map display for ease of interpretation with an icon of the aircraft with current metric data labeled in the synthetic display. In addition to the display of raw and aggregated flight safety information, machine learning models that are trained using the historical flight safety information may predict the likelihood of events based on current flight conditions for crew awareness and briefing. The application adds functionality and value to an interactive navigation/map display such as Interactive Navigation Display (INAV) through a data analytics layer with the geo-referenced phase of flight relevant information to enhance flight crew safety awareness.

The processing system 124 generally represents the hardware, circuitry, logic, firmware, and/or other components of the MCDU 108 configured to perform the various tasks, operations, functions, and/or operations described herein. Depending on the embodiment, the processing system 124 may be implemented or realized with a general-purpose processor, a microprocessor, a controller, a microcontroller, a state machine, an application-specific integrated circuit, a field-programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the processing system 124, or in any practical combination thereof. In this regard, the processing system 124 includes or accesses a data storage element (or memory), which may be realized using any sort of non-transitory short or long-term storage media, and which is capable of storing code or other programming instructions for execution by the processing system 124. In exemplary embodiments described herein, the code or other computer-executable programming instructions, when read and executed by the processing system 124, cause the processing system 124 to implement or otherwise generate an FMS 130 application and perform additional tasks, operations, functions, and processes described herein.

The communications module 126 generally represents the hardware, module, circuitry, software, firmware, and/or a combination thereof that is coupled between the processing system 124 and a communications interface 128 of the MCDU 108 and configured to support communications between the MCDU 108 and the FMC 102 via an electrical connection 129 between the MCDU communications interface 128 and the FMC communications interface 114. For example, in one embodiment, the communications module 126 is realized as an Ethernet card or adapter configured to support communications between the FMC 102 and the MCDU 108 via an Ethernet cable 129 provided between Ethernet ports 114, 128. In other embodiments, the communications module 126 is configured to support communications between the FMC 102 and the MCDU 108 in accordance with the ARINC 429 (A429) standard via an A429 data bus 129 provided between A429 ports 114, 128 of the respective modules 102, 108. In yet other embodiments, the communications module 126 is configured to support communications between the FMC 102 and the MCDU 108 in accordance with the ARINC 422 (A422) standard via an A422 data bus 129 provided between A422 ports 114, 128 of the respective modules 102, 108. In yet other embodiments, the communications module 126 is configured to support communications between the FMC 102 and the MCDU 108 in accordance with the ARINC 739 (A739) standard via an A739 data bus 129 provided between A739 ports 114, 128 of the respective modules 102, 108.

In various embodiments, the FMC 102 and MCDU 108 communicate using a different communications protocol or standard than one or more of the avionics LRUs 104 and/or the display devices 106. In such embodiments, to support communications of data between the MCDU 108 and those LRUs 104 and/or display devices 106, the pilot scorecard performance application 119 at the FMC 102 converts data from one format to another before retransmitting or relaying that data to its destination. For example, the pilot scorecard performance application 119 may convert data received from an avionics LRU 104 to the A429 or Ethernet format before providing the data to the MCDU 108, and vice versa. Additionally, in exemplary embodiments, the FMC 102 validates the data received from an avionics LRU 104 before transmitting the data to the MCDU 108. For example, the FMC 102 may perform debouncing, filtering, and range checking, and/or the like before converting and retransmitting data from an avionics LRU 104.

In exemplary embodiments, the pilot registration application 116 and/or the pilot scorecard performance application 119 when executed by the FMC 102 or indirectly triggered by the MCDU 108, and is configured with appropriate setting, may be enabled to detect a wearable device 165 worn by a pilot or other personnel via automated detection actions in conjunction with applications of the LRUs 104. The detection operation can be enabled by the applications to detect the wearable device 165 in the cockpit area of an aircraft or a predefined location of the aircraft. Further, the pilot registration.

In exemplary embodiments, the pilot registration application 116 and/or the pilot scorecard performance application 119 when executed can enable the authentication in conjunction with LRUs 104 of the personal device 161, the wearable device 165. For example, pilot profile data, and an identification key data received from the wearable device 165 or personal device 161 may be authenticated by requests sent back and forth via the pilot registration application 116 and/or the pilot scorecard performance application 119, and a server-based scorecard application 171 comparing identification information of the pilot stored in a cloud database 175 or the like. Alternately, the authentication processes may be wholly performed locally via avionics systems such as the LRUs 104 with local pilot identification data stored in memories of the FMC 102 or MCDU 108.

In exemplary embodiments, the pilot scorecard performance application 119 or cloud-server-based scorecard application 171 may be configured to generate a set of flight components with a model specified for a flight phase based on data from the wearable device 165, personal device 161 as well as current flight data.

In exemplary embodiments, the graphical user interfaces (GUIs) 107 or 127 of respective avionic systems, the FMC 112 and the MCDU 108 can display on the display devices 106 or 122, displays of data with an icon of the aircraft, and/or runway, etc. with appropriate metrics for dynamic modeling of the flight phase (i.e., approach and landing) together with labels flight data, and performance scoring.

In exemplary embodiments, the wearable device 165 is configured with a GUI 169 to display a glanceable display of information to enable the pilot to execute the performance application to receive a performance score, to trigger the pilot registration system, to send identification key information to avionic systems. In embodiments, the GUI 169 implemented by a wearable device app 167 of the wearable device 165 is configured to display a limited footprint of information that allows for glanceable pilot consumption that can include a flight performance score of a flight phase, a total performance score, flight components, and flight events. The GUI 169 on the wearable device 165 may be selectable by the user (i.e., the pilot) to enable the user to select the information and type of display desired.

It should be noted that although the subject matter may be described herein in the context of the multifunction computing module 108 is realized as an MCDU, in alternative embodiments, the multifunction computing module 108 could be realized as an electronic flight bag (EFB) or another mobile or portable electronic device. In such embodiments, an EFB capable of supporting an FMS 130 application may be connected to an onboard FMC 102 using an Ethernet cable 129 to support flight management functionality from the EFB in an equivalent manner as described herein in the context of the MCDU.

In one or more embodiments, the MCDU 108 stores or otherwise maintains programming instructions, code, or other data for programming the FMC 102 and transmits or otherwise provides the programming instructions to the FMC 102 to update or otherwise modify the FMC 102 to implement the pilot registration application 116, and the pilot scorecard performance application 119. For example, in some embodiments, upon establishment of the connection 129 between modules 102, 108, the MCDU 108 may automatically interact with the FMC 102 and transmit or otherwise provide the programming instructions to the FMC 102, which, in turn, executes the instructions to implement the pilot registration application 116, and/or the pilot scorecard performance application 119.

Most operators have Flight Data Monitoring or Flight Operations Quality Assurance (FOQA) programs to identify, quantify, assess and address operations by monitoring safety events. The main benefits of these programs are operational management at the organizational level and individual event data collection and storage. A safety event is an occurrence or condition in which predetermined values of flight parameters are measured and checked for deviations from Aircraft Flight Manual limits, Standard Operating Procedures (SOP), and good airmanship. Multiple industries and regulatory guides (e.g., IATA FDX, FAA AC 120-82) define safety events and their thresholds or triggers.

Safety events made be caused during typical flight operations by various contextual complexities including for example adverse meteorological conditions; airports surrounded by high mountains; congested airspace; aircraft malfunctions; and unfamiliar routes or airports. Finally, some safety event characteristics (e.g., trends in occurrence rate) may not be directly obvious to, or observable by, flight crews immersed operations and may need to be determined and displayed by safety analytics.

The various LRUs 104 can be configured to monitor for safety events, and to send safety event information to the pilot scorecard performance application 119 for processing by the scorecard performance engine 141 and displayed in the respective GUIs displayed on cockpit displays, the personal device 161, and/or the wearable device 165, with real-time dynamic performance scores inflight.

Figure 2:
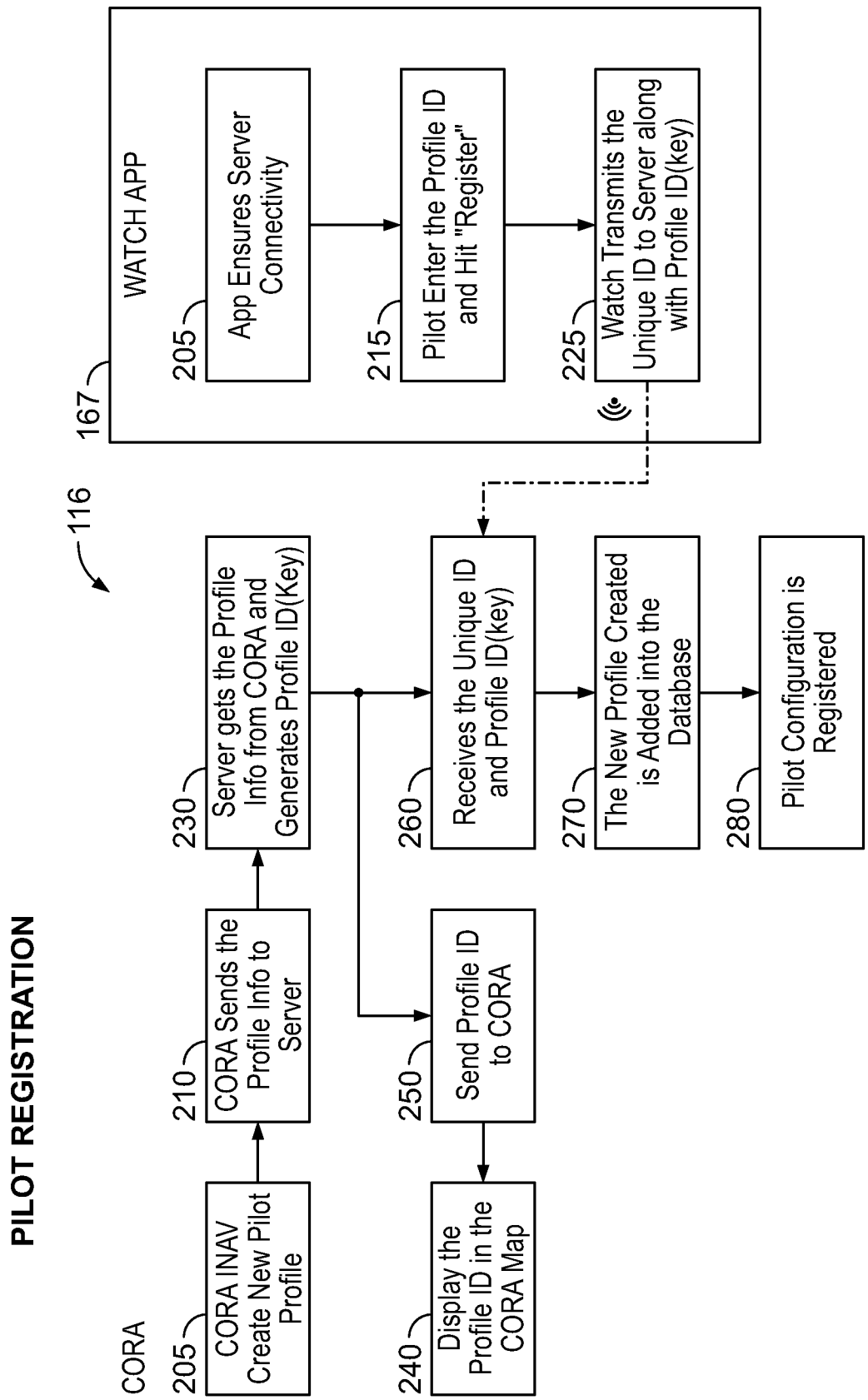
FIG. 2 depicts a process or pilot registration of a wearable device of the pilot performance scorecard system in accordance with exemplary embodiments of the present disclosure.

Turning now to FIG. 2, and with continued reference to FIG. 1, the pilot registration application 116 enables a pilot to create via CORA INAV display, a new pilot profile at step 205. The pilot profile can be preconfigured with data from other sources including various cloud databases or other linked data repositories including airline operator data sites, social networking sites, and local web-browser prefilled storage apps. In other words, automated prefilled and verification steps can be integrated with step 205 to enable the relevant information to be captured in a record for the pilot profile with a minimal manual effort by gathering relevant profile information from linked available sources, and this can also prevent mistakes caused by manual entry; especially in a cockpit setting when multi-tasks are asked of the pilot (i.e, pre-flight checklists, etc..). Once completed, the CORA INAV via a selection operation (e.g., either automated or manually triggered) by the pilot sends the profile data to a linked cloud server 131 (of FIG. 1) for processing and recording by the performance scorecard application 171 (of FIG. 1). In embodiments, the profile data can be configured in a blockchain record structure configured in a cloud database 175 (of FIG. 1) that is linked to the scorecard application 171 that is hosted by the cloud server 131.

At step 230, the cloud server 131 receives the profile data that is inputted via the CORA INAV and generates via the scorecard application 171 a profile identification (ID) (i.e, an identification key), and sends the profile ID at step 250 to CORA interactive navigation display 122. Display device 122 displays at step 240 the profile ID in a synthetic vision display system such as a 3-D rendering of the forward-moving terrain or other surface displays.

At step 260, the avionic systems of the aircraft such as the MCDU 212 receive the unique ID generated by the cloud server and the identification key of the profile ID and create a new profile that is added to the database. The pilot configuration at step 280 is then registered.

At step 260, the unique ID is received from the wearable device 165 where is it created along with the profile ID (key). That is the watch app 167 that is hosted by the wearable device 165 in this case, ensure the connectivity to the cloud server at step 205 by the pilot entering in his/her profile ID, and then actuating on the GUI 169 of the wearable device 165 (i.e., the smartwatch) a button configured on the GUI to execute a "register" operation. In turn, the data of the profile ID is transcoded to generate a unique ID based in part on the inputted profile ID by the pilot (i.e., the user) and this is at step 225 transmitted to the cloud server 131 (i.e., received in the processing of step 260 at the cloud server 131). The new profile that is created is based on both the profile ID and the unique ID. The TRACS server (i.e., the pilot profile server) implements an avionic system of the aircraft, implements a database type operation, has a mechanism to receive the profile ID and to display it on a CORA map page. It retains the profile ID data in a JSON object and loads the profile as the JSON object. The watch app has a default configuration to enable entering the profile ID and enables the profile ID to be received by the cloud server, verified at the cloud server, and successfully registered.

In an alternate registration mode, instead of using the watch app 167 for registration and authentication, the system may be implemented without requiring a wearable device 165. In this exemplary embodiment, the pilot would directly manually input a profile ID via the MCDU 212 that would identify and authenticate the pilot based on the information entered. The pilot manual input action can include providing biometric information via a biometric sensor or manually entering a code. Once received, the registration and authenticating would follow the above-described processes. Further, the computation of the performance component scores via the scorecard performance engine would be performed similarly but without data from the wearable device as this data is not available. Hence the pilot access and link to the flight data to the cloud server to receive computed performance scores would in this instance be provided based on the manual input actions and the authentication of the manual input data.

Figures 3, 4:
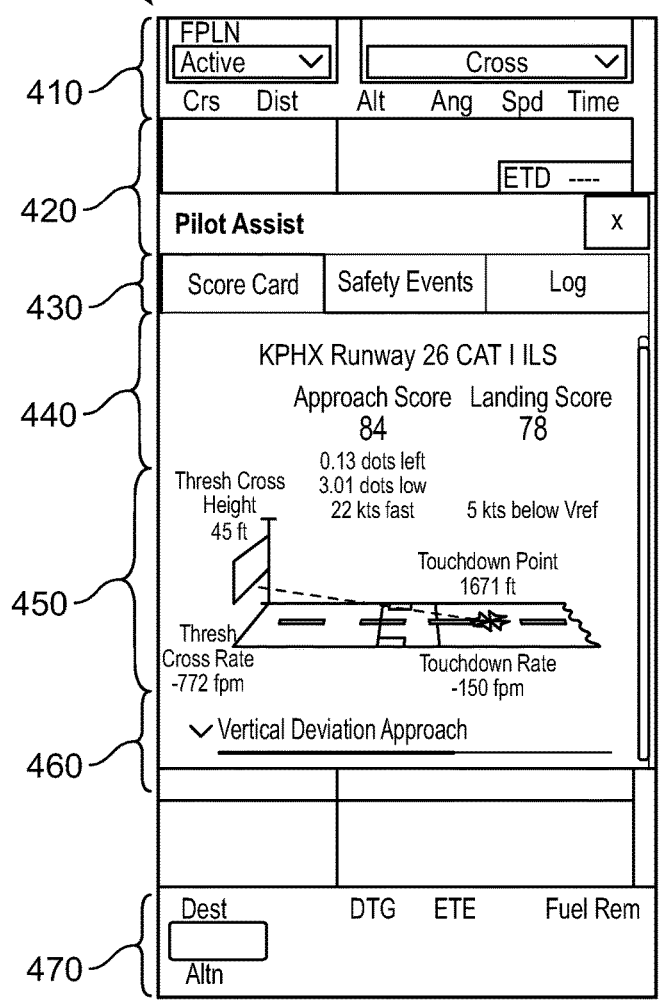
FIG. 3 is an exemplary chart of the different score components that are used to determine the total performance score in a flight phase of the pilot performance scorecard system in accordance with exemplary embodiments of the present disclosure.
FIG. 4 is an exemplary display of the graphical user interface (GUI) of the performance scorecard on a display device of the pilot performance scorecard system in accordance with exemplary embodiments of the present disclosure.

FIG. 3 is an exemplary chart of the different score components that are used to determine the total performance score in a flight phase of the pilot performance scorecard system in accordance with exemplary embodiments. The exemplary chart 300 in FIG. 3 includes a set of different component scores 310, a set of previous weights for the total score 320, a set of the new weights for the total score 330, a set of weights of an approach score 340, and a set for the landing score 350.

In an exemplary embodiment, the set of weights for the approach score 340 corresponds to the set of score components of lateral deviation, vertical deviation, approach airspeed, back angle, and path convergence. It is noted that that the weighting factor for the path convergence score component is highest with a weight of "40" followed by the lateral and vertical deviations with a weight of "20" each, and the approach airspeed and bank angle allocated each a weight of "10". The weighting factors for the landing score 350 are distributed with the higher weight for the vertical speed and touchdown point of "30", next followed by the weight of "15" for body lateral acceleration and threshold cross height, and finally by the weight of "10" for touchdown airspeed. The set of the previous weights for total score 320 and the set of new weights for the total score 330 have been reconfigured with added weights to the body lateral acceleration, and the touchdown airspeed, and decreased weights to the touchdown point and the vertical speed. Hence the components of the touchdown airspeed and body lateral acceleration are added to the total landing score computation.

FIG. 4 is an exemplary display 400 of the graphical user interface (GUI) of the performance scorecard on a display device of the pilot performance scorecard system in accordance with exemplary embodiments. The exemplary display 400 includes various selectable visual indicators of a set of common current aircraft indicators in region 410 indicative of the current aircraft state of course "Crs", distance to location "Dist", altitude "Alt", Angle "Ang", speed "Spd", and time to the destination, as well at the flight number "FPLN" and cross control state "Cross" with a pull-down tab of the active state. In region 420, the pilot assist is indicated and an ETD label of the estimated departure time. Various tabs in region 430 are configured that enable the selection of the "Scorecard", the "Safety Events", and the aircraft "Log". The selection of the scorecard tab is shown with the regions 440, 450, 450, and 470. Region 440 shows the runway number for the instrument system landing, and the computed approach score of "84" and landing score of "78". An icon in region 450 is shown of the approach and landing in region 450 and various labeled metrics. In region 450, a graph of the vertical deviation is shown corresponding to the icon of the approach and landing. In region 470, other attributes as desired of the aircraft are indicated such as fuel remaining, estimated time en route "ETE", destination altitude, distance to go "DTG", etc.

FIGS. 5A, 5B, 5C, 5D, and 5E are a set of graphs and a threshold chart that show capturing of body lateral acceleration (BLA) data at a frequency of 40 Hz in FIGS. 5A and 5B, and the logging of data at a lag of 0.1 and 0.2 seconds in FIGS. 5C and 5D, and the thresholds allocated to the component in the threshold chart of FIG. 5E of the BLA to determine the weight to be allocated to the BLA component in the total pilot performance score computation of the set of different components.

FIG. 6 illustrates an exemplary set of a sequence of onscreen displays of a pilot registration application of a wearable device of the pilot performance scorecard system in accordance with exemplary embodiments. In FIG. 6, the set of the sequence of onscreen displays of the wearable device includes an on-screen display 610 that shows the default IP address to the viewer of the wearable device with no connection to the cloud server, the on-screen display 620, shows the default IP address and the wearable device connected to the server, the on-screen display 630 that shows the pilot registration in progress, the on-screen display 640 that shows a voice tab for selecting for entering by voice the profile ID or another tab for selecting touch screenwriting of the profile ID, the on-screen display 650 of the entering of the profile ID, and the onscreen display 660 indicating to the view of successful registration.

FIG. 7 illustrates a display on a cockpit of the registration 710 of the wearable device, and the pilot cloud server logs 720 of IP connections to the wearable device of the pilot performance scorecard system in accordance with exemplary embodiments.

FIG. 8 illustrates a screenshot of an exemplary display of the pilot performance scorecard with graph 810 of the vertical deviation of aircraft on an approach and landing the pilot performance scorecard system in accordance with exemplary embodiments.

FIGS. 9A and 9B illustrate a lateral navigation display with side by side scorecard display including an icon of the aircraft state, and a related weighted component chart of calculated component scores for the total pilot performance score of the pilot performance scorecard system in accordance with exemplary embodiments. In FIG. 9A the lateral navigation display 900 is shown with an adjacent pilot performance scorecard 910 display incorporated in a cockpit display for simultaneous viewing of both displays in an exemplary depiction of a landing scenario. In FIG. 9B, the calculated weights in chart 920 for the total pilot performance score are shown.

FIGS. 10A and 10B illustrate a lateral navigation display with side by side scorecard display including an icon of the aircraft state, and a related weighted component chart of calculated component scores for the total pilot performance score of the pilot performance scorecard system in accordance with exemplary embodiments. In FIG. 10A the lateral navigation display 1000 is shown with an adjacent pilot performance scorecard 1010 display incorporated in a cockpit display for simultaneous viewing of both displays in an exemplary depiction of a landing scenario. In FIG. 10B, the calculated weights in chart 1020 for the total pilot performance score are shown.

In an exemplary embodiment, in FIG. 10A, the landing scenario generated the pilot scorecard while the other landing scenarios were aborted landing in which the Weight-On-Wheels (WOW) did not approach a predefined threshold of 1 (staying at a 0) which caused the performance scorecard engine not to be initiated and not to calculate any performance scores for the approach.

FIG. 11 is a flowchart of an exemplary process for calculating the total performance score of the pilot scorecard performance system in accordance with various exemplary embodiments.

The flowchart 1100 of FIG. 11 describes a process for displaying a scorecard for rating pilot flight performance. At step 1110, the process is initiated by detecting a wearable device in the vicinity of the cockpit (i.e., a wearable device worn by a pilot), and implementing a set of requests to authenticate and register the wearable device. In most instances, the wearable device is linked to a smartphone or other personal device, and in response to notification (via a cellular, Wi-Fi, or Bluetooth scanning operation) by a cockpit avionic system (i.e., FMS) initiates a multistep registration process to enable the linking of both the wearable device and the personal device (which is linked to the wearable device) to the aircraft avionic system and to a cloud-server that hosts applications including the scorecard performance engine.

At step 1120, in response to detection of the pilot's wearable device, an authentication step is performed based on receiving data about the pilot ID that is transcoded into identification key data and based on location and pilot profile data received from the wearable device. The identification key data is transmitted when the pilot ID is inputted by a manual or voice operation by the pilot using the wearable device. The identification key data transmission is made along with other data including the profile ID and location data of the wearable device to enable the avionic systems through processing locally or processing with requests back and forth to a cloud server that is networked with the avionic system, to determine whether the wearable device should be enabled to be linked to aircraft avionic system and provided with access to dynamic flight data of the aircraft operations.

In embodiments, the authentication is based on the record information that is configured in a provisioning step by placing the wearable device in a set-up mode for setting up a pilot registration, creating a pilot profile in the registration mode of the wearable device using a graphic user interface of the avionic system in conjunction with the wearable device, and sending the pilot profile to send to the cloud server. In response to receipt of the pilot profile by the cloud server, generating by the cloud server a profile identification key for linking the wearable device to the avionic system, and then sending the profile identification key to the scorecard performance application at a networked cloud-server by the avionic system. Finally, adding the profile identification key to a database by a server scorecard performance application at the networked cloud server; and in response to confirmation of the profile identification key, configuring the pilot registration process for the avionic system to authenticate the wearable device.

In exemplary embodiments, in an alternate or another operable mode for pilot detection and authentication, in response to a manual input action by the pilot via an interface of the avionic system in the aircraft cockpit, the avionic system can authenticate pilot identity to enable pilot access and to link the flight data to the cloud server to receive the computed performance scores, without the use of the wearable device, for display in-flight via a cockpit display.

At step 1130, while in flight, or as requested by the pilot via the pilot's device, or the wearable device, computed performance scores are provided to the pilot on the wearable device, the cockpit display, and the personal device. For example, based on the flight phase, in a GUI of various cockpit systems, the pilot performance scorecard is displayed in a manner to be integrated into the cockpit display and to provide a side-by-side viewing of a lateral navigation map displayed with the aircraft current location, and the scorecard display with performance scores associated with the aircraft current flight phase. In this instance, the scorecard performance engine generates a performance score calculated on a set of components of the flight phase, and weights each of the flight components to generate a total performance score. The pilot's total performance score is displayed for the flight phase such as the approach or landing on multiple displays of cockpit systems, personal devices, and wearable devices for the pilot to be aware based on current aircraft dynamics what his/her personal performance score is about the activities currently performed.

At step 1140, in another embodiment, a chart of the components and the weight afforded to each component of the flight phase is displayed on the various displays to the pilot. The weighting of each component is adjusted by the scorecard performance engine, and compared with prior component weights, and adjusted based on flight metrics, and other data.

At step 1150, in another embodiment, the scorecard of the pilot's flight performance is displayed with a synthetic dynamic image of the aircraft, location of the aircraft, and metrics associated with the aircraft's position and flight. For example, the current altitude, touchdown point, and scores such as the approach score and landing score are displayed with an icon on a scorecard. The scorecard is divided into multiple regions that include various flight data that capture labeled metrics of the flight data that provide visual cues to the pilot to enhance pilot situational awareness of the current aircraft state and to provide performance scoring to the pilot at a given time and location.

At step 1160, in another embodiment, actuation by the pilot of other tabs on the scorecard display on a touchscreen interface provides displays of safety event information and log information.

At step 1170, in another embodiment, a display is provided in another region of the scorecard display of the vertical deviation approach graph that shows the current latitude and a graph of the computed rate of descent of the aircraft in the approach to the touchdown that again increases the pilot's positional awareness as well as awareness of the approach and landing scores about calculated vertical deviations of the aircraft in each state.

At step 1180, in another embodiment, glanceable information including a flight phase or flight phase component score or total component performance score is displayed on the wearable device of the pilot in real-time. The wearable device provides limited correlated information for the pilot to track at a glance (i.e., a viewing of fewer than 5 seconds) of approach or landing related personal computed score data, and other aircraft dynamic flight data for pilot consumption by a moment view of the display of the wearable device in real-time while performing flight activities during the flight.

Although an exemplary embodiment of the present disclosure has been described above in the context of a fully-functioning computer system (e.g., the process described above in FIG. 11 in conjunction with FIG. 1), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

Techniques and technologies may be described herein in terms of functional and/or logical block components, and about symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" to emphasize their implementation independence more particularly. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for displaying a scorecard for rating pilot flight performance, comprising:
   detecting, by a flight management system (FMS) of an aircraft, a wearable device worn by a pilot when the pilot is located in a vicinity of an aircraft cockpit;
   receiving a profile identification key from a cloud server at the FMS in response to transmission of pilot profile data of the pilot from the FMS to the cloud server;

receiving a pilot profile registration confirmation from the cloud server at the FMS, the pilot profile registration confirmation being based on creation of a pilot profile based on the pilot profile data at the cloud server in response to receipt of the profile identification key and a unique identifier generated by the wearable device from the wearable device at the cloud server, wherein the unique identifier is generated along with the profile identification key by the wearable device for transmission to the cloud server and the unique identifier is a transcoded version of the profile identification key;

in response to receipt of the pilot profile registration confirmation, linking, by the FMS the wearable device to the FMS to receive flight data, and to the cloud server to receive a total flight phase performance score for display by the wearable device;

receiving tracked data from at least one avionics line replacement unit (LRU) at the FMS, the tracked data being associated with a plurality of score components of a flight phase;

transmitting the tracked data associated with the plurality of score components of the flight phase from the FMS to the cloud server;

receiving from the cloud server at the FMS, the total flight phase performance score computed by a scorecard performance engine in association with the pilot profile at the cloud server, wherein the total flight phase performance score is computed from a sum of a plurality of component scores of the plurality of score components of the flight phase; and displaying, by the FMS, on a graphical user interface in a cockpit display the scorecard comprising at least an icon of the aircraft with a geo-referenced position and the total flight phase performance score.

2. The method of claim 1, further comprising:
displaying at least the flight phase and the total flight phase performance score on the wearable device simultaneously with the cockpit display of the scorecard.

3. The method of claim 1, wherein each of the plurality of component scores of the total flight phase performance score is derived based on a comparison by the scorecard performance engine of flight data and a prior component score and wherein the total flight phase performance score is computed based on a weighting of each of the plurality of component scores of the plurality of score components of the flight phase by the scorecard performance engine.

4. The method of claim 1, further comprising:
rendering, on a display of the wearable device the scorecard comprising at least one component score associated with one of the plurality of score components of the flight phase.

5. The method of claim 1, further comprising:
rendering on a display of the wearable device, context-relevant information of a flight phase event, and at least one component score associated with one of the plurality of score components of the flight phase.

6. The method of claim 1, further comprising:
rendering on a display of the wearable device, a touch actuation screen of a graphical user interface for the pilot to enter the profile identification key to enable the wearable device to transmit the unique identifier to the cloud server.

7. The method of claim 1, wherein the total flight phase performance score is a real-time computation of a sum of weighted individual component scores generated by the cloud server and transmitted via a network cloud to the FMS.

8. The method of claim 1, further comprising:
displaying, in the scorecard, the icon of the aircraft in the flight phase with metrics of labeled score components of the flight phase, location metrics of the aircraft, and associated components scores of each of the plurality of score components of the flight phase.

9. The method of claim 1, further comprising:
displaying a vertical deviation graph corresponding to a location of the aircraft and a vertical deviation in the flight phase wherein the display of the vertical deviation graph changes in vertical height on an approach.

10. The method of claim 1, further comprising:
placing the wearable device in a set-up mode for setting up a pilot profile registration;
creating the pilot profile data in a registration mode of the wearable device using a graphic user interface of the FMS in conjunction with the wearable device, and sending the pilot profile data to the cloud server;
in response to receipt of the pilot profile data by the cloud server, generating by the cloud server the profile identification key for linking the wearable device to the FMS;
sending the profile identification key from the cloud server via a networked cloud-server to the FMS;
adding the profile identification key to a database at the cloud server; and
in response to receipt of the profile identification key at the FMS, configuring a pilot registration process for the FMS to authenticate the wearable device.

11. The method of 1, further comprising:
in response to the pilot entering the profile identification key and actuating a register button on a graphical user interface of the wearable device, transmitting by the wearable device the profile identification key and the unique identifier to the cloud, the unique identifier being a transcoded version of the profile identification key.

12. A system for displaying a scorecard for rating pilot flight performance, the system comprising:
a flight management system (FMS) configured to:
detect a wearable device worn by a pilot when the pilot is located in a vicinity of an aircraft cockpit;
receive a profile identification key from a cloud server in response to transmission of pilot profile data of the pilot to the cloud server;
receive a pilot profile registration confirmation from the cloud server, the pilot profile registration confirmation being based on creation of a pilot profile based on the pilot profile data at the cloud server in response to receipt of the profile identification key and a unique identifier from the wearable device at the cloud server, wherein the unique identifier is generated along with the profile identification key by the wearable device for transmission to the cloud server and the unique identifier is a transcoded version of the profile identification key;
in response to receipt of the pilot profile registration confirmation, link the wearable device with the FMS to receive flight data, and to the cloud server to receive a total flight phase performance score for display by the wearable device;
receive tracked data from at least one avionics line replacement unit (LRU), the tracked data being associated with a plurality of score components of a flight phase;

transmit the tracked data associated with the plurality of score components of the flight phase to the cloud server;

receive from the cloud server the total flight phase performance score computed by a scorecard performance engine in association with the pilot profile at the cloud server, wherein the total flight phase performance score is computed from a sum of plurality of component scores of the plurality of score components of the flight phase; and display on a graphical user interface in a cockpit display the scorecard comprising at least an icon of the aircraft with a geo-referenced position and the total flight phase performance score.

13. The system of claim 12, wherein the FMS is further configured to:

display at least the flight phase and the total flight phase performance score on the wearable device simultaneously with the cockpit display of the scorecard.

14. The system of claim 12, wherein each of the plurality of component scores of the total flight phase performance score is derived based on a comparison by the scorecard performance engine of flight data and a prior component score and wherein the total flight phase performance score is computed based on a weighting of each of the plurality of component scores of the plurality of score components of the flight phase by the scorecard performance engine.

15. The system of claim 12, wherein the FMS is further configured to:

transmit the scorecard comprising at least one component score associated with one of the plurality of score components of the flight phase to the wearable device for display by the wearable device.

16. The system of claim 12, wherein the FMS is further configured to:

transmit context-relevant information of a flight phase event, and at least one component score associated with one of the plurality of score components of the flight phase to the wearable device for display by the wearable device.

17. The system of claim 12, wherein the FMS is further configured to:

display at the wearable device, an actuation screen of a user interface for the pilot to enter the profile identification key to enable the wearable device to transmit the unique identifier to the cloud server, the unique identifier being a transcoded version of the profile identification key.

18. The system of claim 12, wherein the total flight phase performance score is a real-time computation of a sum of weighted individual component scores generated by the cloud server and transmitted via a network cloud to the FMS.

19. The system of claim 12, wherein the FMS is further configured to:

display, in the scorecard, the icon of the aircraft in the flight phase with metrics of labeled score components of the flight phase, location metrics of the aircraft, and associated component scores of each of the plurality of score components of the flight phase.

20. A system comprising at least one processor communicatively coupled to a system memory element and configured to:

detect a wearable device worn by a pilot when the pilot is located in a vicinity of an aircraft cockpit;

receive a profile identification key from a cloud server in response to transmission of pilot profile data of the pilot to the cloud server;

receive a pilot profile registration confirmation from the cloud server, the pilot profile registration confirmation being based on creation of a pilot profile based on the pilot profile data at the cloud server in response to receipt of the profile identification key and a unique identifier from the wearable device at the cloud server, wherein the unique identifier is generated along with the profile identification key by the wearable device for transmission to the cloud server and the unique identifier is a transcoded version of the profile identification key;

in response to receipt of the pilot profile registration confirmation, link the wearable device to a flight management system (FMS) to receive flight data, and to the cloud server to receive a total flight phase performance score for display by the wearable device;

receive tracked data from at least one avionics line replacement unit (LRU), the tracked data being associated with a plurality of score components of a flight phase;

transmit the tracked data associated with the plurality of score components of the flight phase to the cloud server;

receive from the cloud server, the total flight phase performance score computed by a scorecard performance engine in association with the pilot profile at the cloud server, wherein the total flight phase performance score is computed from a sum of a plurality of component scores of the plurality of score components of the flight phase; and display on a graphical user interface in a cockpit display, a scorecard comprising at least an icon of the aircraft with a geo-referenced position and the total flight phase performance score.

* * * * *